(12) United States Patent
Nakamura et al.

(10) Patent No.: US 6,330,897 B1
(45) Date of Patent: Dec. 18, 2001

(54) PNEUMATIC TIRE CONTAINING A VULCANIZATION ACCELERATOR

(75) Inventors: Shun Nakamura, Tokyo; Yuichi Nishimaki, Saitama-ken; Eiji Yamanaka, Tokyo, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 08/891,497

(22) Filed: Jul. 11, 1997

(30) Foreign Application Priority Data

Jul. 15, 1996 (JP) .................................................. 8-184975
Jul. 22, 1996 (JP) .................................................. 8-192518
Jul. 23, 1996 (JP) .................................................. 8-193453

(51) Int. Cl.[7] .......................................................... B60C 1/00
(52) U.S. Cl. ........................ 152/537; 152/547; 152/564; 525/349
(58) Field of Search ..................................... 152/564, 537, 152/547

(56) References Cited

U.S. PATENT DOCUMENTS

| 2,955,102 | * | 10/1960 | Clayton | 525/349 |
| 3,086,018 | * | 4/1963 | Hardman | 525/349 |
| 3,852,251 | * | 12/1974 | Maxey | 525/349 |

FOREIGN PATENT DOCUMENTS 1570151   5/1970   (DE) .
0818500 A1   1/1998   (EP) .

OTHER PUBLICATIONS

Patent Abstract of Japan, vol. 007, No. 181, Abstract of JP 58/087138, May 24, 1983.
Patent Abstract of Japan, vol. 006, No. 015, Abstract of JP 56/139542, Oct. 31, 1981.

U.S. Application Ser. No. 08/892,840, filed Jul. 11, 1997; Okamura et al.

* cited by examiner

Primary Examiner—Christopher Henderson
(74) Attorney, Agent, or Firm—Sughrue, Mion, Zinn, Macpeak & Seas, PLLC

(57) ABSTRACT

A pneumatic tire formed by using a rubber composition comprising a vulcanization accelerator represented by the following general formula:

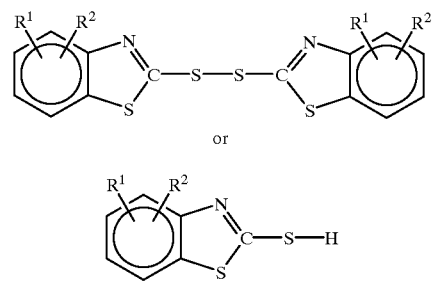

wherein $R^1$ represents a hydrogen atom, an alkyl group, or an aryl group, and $R^2$ represents an alkyl group or an aryl group when $R^1$ represents a hydrogen atom, and represents a hydrogen atom, an alkyl group, or an aryl group when $R^1$ represents an alkyl group or an aryl group, in an amount of 0.2 to 8.0 parts by weight per 100 parts by weight of a rubber component.

A pneumatic tire which maintains low rolling resistance and is improved to prevent resistance to ply-end separation throughout the entire term of tire use, a pneumatic tire which shows excellent controllability and durability in the last stage of tire use, and a pneumatic tire which prevents heat aging of belt layers and a decrease in the adhesion of steel cord with a rubber composition and shows excellent durability are provided.

10 Claims, 3 Drawing Sheets

F I G. 2
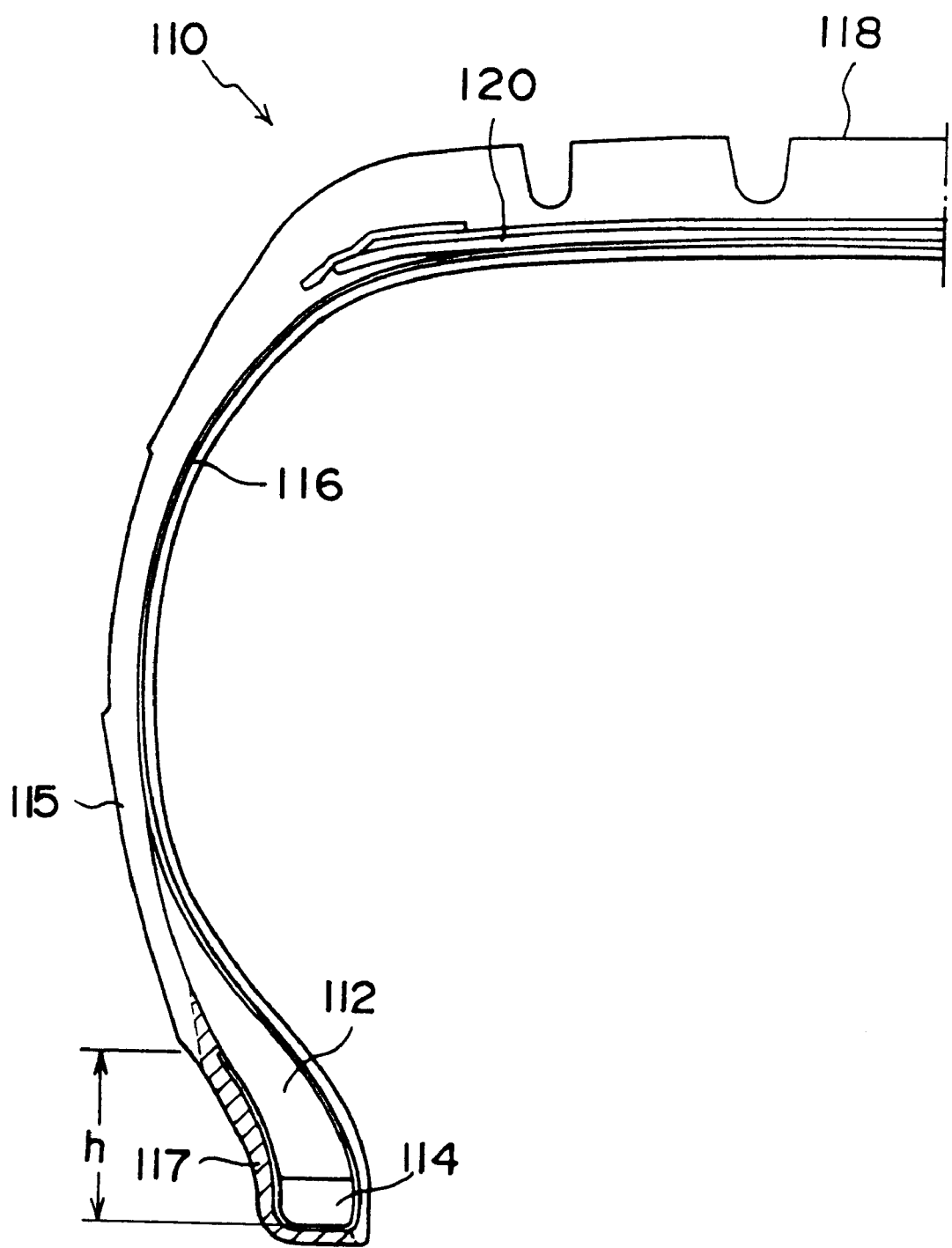

PNEUMATIC TIRE CONTAINING A VULCANIZATION ACCELERATOR

BACKGROUND OF THE INVENTION

1. Field of the Invention

The present invention relates to a pneumatic tire, and more particularly to a pneumatic tire which can maintain low rolling resistance and is improved to prevent a separation at an end of an carcass ply (ply-end separation) throughout the entire term of tire use, a pneumatic tire which is remarkably improved to prevent the fracture of the hard bead filler in the pneumatic tire caused by tire use and shows improved controllability and durability in the last stage of tire use, and a pneumatic tire which comprises a belt layer having excellent durability.

2. Description of Related Art

With automobile functions and performance becoming continuously enhanced, tires are strongly required to provide a decrease in weight and in rolling resistance (decrease in fuel consumption), and an increase in durability.

For decreasing the weight and cost of a tire, and for improving riding quality, a low turnup structure is known in which an end of a carcass ply (ply-end) is disposed at a height of 10 to 40 mm. A tire having this structure, however, with high strain at a ply-end part involves the possibility of ply-end separation causing problems with the tire. As a method of preventing this problem, a method in which sidewall compound is adhered beneath a gum chafer to relax strain, i.e., the method of so called "reversed side structure", has been used.

As a method of preventing the above problem by adjusting the formulation of the rubber composition coating carcass ply cords (ply coating rubber), improvements in resistance to crack growth and in resistance to aging of the rubber composition itself have been examined. The use of higher grade carbon black has been examined for improving the resistance to crack growth, and a method of effective vulcanization (EV cure) has been examined for improving resistance to aging.

In the reversed side structure, another piece of side rubber composition, which is called as "a cover strip" should be placed in order to prevent the ozone cracking of the gum chafer around the boundary area of the sidewall compound and the gum chager, as illustrated in FIG. 3.

The addition of this extra component causes an extra step and decreases productivity. The method of using higher grade carbon black to improve properties of a rubber composition tends to increase the rolling resistance because of the increase in heat buildup of the rubber composition. This method also adversely affects the workability in calendering in tire production. Further, the method of improving the resistance to breakage by the EV cure decreases the resistance to crack growth.

Various formulations have been examined for various parts of a tire. For the vulcanization accelerator, Japanese Patent Application Laid-Open (JP-A) No. 58-87138 discloses that the resistance to thermoset and the appearance of a tire in the last stage of tire use can be improved by using a rubber composition comprising a specific vulcanization accelerator and a specific antioxidant in a tire tread. In the above specification, nothing is disclosed about ply coating rubber, however, and neither the rolling resistance nor durability of a tire are examined. Japanese Patent Application Laid-Open (JP-A) No. 56-139542 discloses that the scorching of a rubber composition during mixing can be prevented by using a rubber composition comprising a specific vulcanization accelerator. In this specification, however, no description or suggestion is found on ply coating rubber or properties of a tire.

On the other hand, a pneumatic tire is required to have improved controllability in addition to improved durability.

For example, a tire, such as radial tire, in which the the carcass is composed of a small number of plies, generally has a structure such that a bead filler 24 which is made of hard rubber and has a damping property is disposed on a bead wire 16, and a carcass ply 14 is disposed along the inside of the bead filler 24 and is turned up at the bottom of the bead wire 16 to integrate the entire bead part as shown in FIG. 1. When a tire has this structure, stress tends to concentrate excessively to the turnup part 20 because of the inner pressure of the tire, the force applied in every rotation of the tire, and the irregular deformation by external force applied in the direction parallel to the road surface, and the concentrated stress accounts for the ply-end separation during tire use. To overcome this problem, a structure is proposed, for example, in Japanese Patent Application Publication (JP-B) No. 57-30681, in which the turnup part of the carcass ply is disposed only at a periphery of the bead wire, and the carcass and the bead wire are made to adhere tightly, and a bead filler made of a hard rubber (rubber stock) is disposed along the outside of the combined structure to integrate the bead part.

It is well known that fatigue which causes fracture is decreased and controllability is improved when an ultrahard rubber is disposed in the bead part. A hard rubber, however, generally has a smaller elongation at the time of the cutting (Eb) than a soft rubber. Moreover, the resistance to fracture of a hard bead filler is further decreased as tire is used longer. Therefore, there is the possibility that the durability of a bead filler may be decreased in the last stage of tire use.

For suppressing the decrease in resistance to fracture of a hard bead filler due to driving, an effective vulcanization system (EV cure system) can be used. In this method, a larger amount of a vulcanization accelerator is used in a rubber composition to decrease the amount of sulfur. Therefore, the amount of free sulfur which does not take part in cross-linking is decreased. As a result, hardening caused by additional cross-linking of a rubber composition under the tire use is prevented, and a decrease in Eb of a rubber composition is prevented. According to this method, Eb of a hard bead filler can be improved. The resistance to crack growth, which is another factor relating to the fracture of a bead filler, is decreased, however. This method therefore does not sufficiently improve the resistance to fracture of a hard bead filler in the last stage of tire use.

As another method for suppressing decrease in the resistance to fracture of a hard bead filler, there is a method in which carbon black having a smaller particle diameter is used as a filler in a rubber composition. This method is widely known as a method for raising the level of overall breaking properties of a bead filler part by increasing the reinforcing property of carbon black. Although the breaking properties of a bead filler can be improved by using this method, a problem arises in that the flow property of rubber composition becomes markedly inferior because of the highly reinforcing property of carbon black and workability is deteriorated to a great extent.

As described above, despite the various attempts made, a tire satisfying both controllability and durability, which are important properties required for a pneumatic tire, in the last stage of tire use has not been obtained.

On the other hand, in the belt layer used in a radial tire which comprises steel cord and rubber composition covering the steel cord (belt coating rubber), it is important that the adhesion between the steel cord and the belt coating rubber is maintained at a high level. It is known that a decrease in adhesion decreases the durability of the belt layer which, the property of the rubber composition at age, in turn, decreases he durability of the tire. For improving the adhesion between steel cord and the belt coating rubber, a method of increasing the amount of sulfur used in the rubber composition as a vulcanizing agent has heretofore been used. It is found, however, that this method has a problem that aging property, particularly heat aging property, of the belt coating rubber is deteriorated so that belt-edge separation caused by aging takes place in the last stage of tire use, although adhesion is improved.

To prevent the aging of a rubber composition, a technology in which the aging of tread rubber and side rubber is suppressed and appearance of a tire in the last stage of tire use is improved by using a combination of a specific antioxidant and a specific vulcanization accelerator is disclosed in Japanese Patent Application Laid-Open (JP-A) No. 58-87138. No examination has been made, however, on the adhesion of rubber to a metal, such as steel cord.

As described above, it also has strongly been desired that a tire which has excellent durability, which is an important property required for a tire, particularly a tire which can prevent a decrease in strength in the last stage of tire use caused by the deterioration of the belt layer is developed.

SUMMARY OF THE INVENTION

The present invention has been made under the above circumstances. The first object of the present invention is to provide a pneumatic tire which maintains low rolling resistance at a high level and shows improved ply-end separation in various structures by improving the properties of rubber which are useful for preventing ply-end separation, i.e., resistance to crack growth and high breaking properties, throughout the entire term of tire use.

The second object of the present invention is to provide a pneumatic tire which remarkably improves the resistance to fracture of a bead filler without having adverse effects on workability and thereby can simultaneously improve controllability and durability in the last stage of tire use.

The third object of the present invention is to provide a pneumatic tire having excellent durability by improving a rubber composition used in a belt layer of the tire and thereby preventing aging of the belt layer.

As a result of extensive study conducted by the present inventors, it was found that the above objects can be achieved by using a rubber composition comprising a specific vulcanization accelerator in a specific amount. The present invention has been completed based on this knowledge.

Accordingly, the present invention provides a pneumatic tire formed by using a rubber composition comprising a vulcanization accelerator represented by the following general formula:

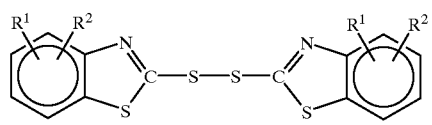

-continued
or

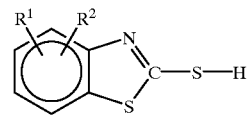

wherein $R^1$ represents a hydrogen atom, an alkyl group, or an aryl group, and $R^2$ represents an alkyl group or an aryl group when $R^1$ represents a hydrogen atom, and represents a hydrogen atom, an alkyl group, or an aryl group when $R^1$ represents an alkyl group or an aryl group, in an amount of 0.2 to 8.0 parts by weight per 100 parts by weight of a rubber component.

In more detail, the present invention has the following three aspects: In the first aspect of the present invention, the pneumatic tire comprising a pair of bead parts each having a bead filler and a bead core, a carcass layer having a toroidal shape which is extended between the pair of bead parts, a tread part disposed at a crown part of the carcass layer, and at least two belt layers disposed at the inside of the tread part, the carcass layer having one or a plurality of carcass plies, end portions of the carcass plies being turned up at the respective bead parts, and ends of turnup parts of at least one carcass ply being disposed at a height of 10 to 40 mm from the bottom of the respective bead parts, wherein the ply coating rubber is the rubber composition described above. The ply coating rubber preferably comprises 0.2 to 5.0 parts by weight, more preferably 0.2 to 2 parts by weight of said vulcanization accelerator per 100 parts by weight of the rubber component.

In the pneumatic tire of the first aspect of the present invention, the compounds causing inferior crack growth resistance, such as monosulfide and disulfide, are not formed in the vulcanized rubber, unlike in the EV cure because the above vulcanization accelerator is used, and therefore the pneumatic tire of the present invention shows superior resistance to crack growth and resistance to aging, compared to tires using conventional ply coating rubbers. This is because decrease with the passage of time in the resistance to crack growth and in the breaking properties is slight.

In the second aspect of the present invention, the pneumatic tire comprising a pair of bead parts, a pair of side parts extended from the bead parts, a tread part disposed between the pair of side parts, at least one carcass ply which is extended between a pair of bead cores each disposed in the respective bead parts, both end portions of the carcass ply being turned up at the respective bead cores from inside to outside to form a pair of turnup parts, and a pair of bead fillers extended from the bead cores upward between the carcass ply and the respective turnup part, wherein the bead fillers comprise the rubber composition described above. The rubber composition for the bead fillers preferably comprises 0.3 to 8.0 parts by weight, more preferably 0.3 to 5.0 parts by weight of the vulcanization accelerator per 100 parts by weight of the rubber component and has a 50% tensile stress of 0.29 MPa or more.

It is generally known that Eb in a hard rubber composition constituting a bead part in the last stage of tire use is related to the amount of residual unreacted free sulfur after vulcanization. The smaller the amount of residual sulfur, the greater the Eb in the last stage of tire use. On the other hand, when the amount of residual sulfur is large, a problem arises in that the residual sulfur causes additional crosslinking in the presence of residue groups of a vulcanization accelerator in the rubber composition and durability becomes inferior.

The mechanism of the second aspect of the present invention has not been fully elucidated, but is considered as follows. The additional cross-linking by heat generation during the tire use is decreased because the amount of residual groups of a vulcanization accelerator which cause the additional cross-linking is decreased by using the thiazol vulcanization accelerator represented by the above general formula in the rubber composition, and the decrease in Eb can be prevented without decreasing controllability, which has been improved by the bead fillers of hard rubber, or decreasing the resistance to crack growth. Thus, the durability of the tire in the last stage of tire use is improved.

In the third aspect of the present invention, the pneumatic tire comprising a tread part, a pair of sidewalls, a pair of bead parts, at least one carcass ply reinforced by cords which are disposed in a direction substantially parallel to a radial direction of the pneumatic tire, and a belt layer disposed at the outside of the carcass ply in the radial direction, wherein the belt layer comprises the rubber composition described above. The rubber composition for the belt layer preferably comprises 0.2 to 5.0, more preferably 0.2 to 2.0 parts by weight of the vulcanization accelerator per 100 parts by weight of the rubber component.

It is generally known that the adhesion between a steel cord and the belt coating rubber is related to the amount of residual sulfur after vulcanization. The larger the amount of the residual sulfur, the stronger the adhesion in the last stage of tire use. On the other hand, when the amount of residual sulfur is large, a problem arises in that the residual sulfur causes additional crosslinking in the presence of the residue groups of a vulcanization accelerator in the rubber composition, and therefore the resistance to aging under heat becomes inferior.

The mechanism of the third aspect of the present invention has not been fully elucidated, but is considered as follows. The decrease in resistance to aging is prevented without decreasing the amount of residual sulfur which contributes to adhesion because the amount of the residue groups of the vulcanization accelerator which cause additional cross-linking is decreased by using the above specific vulcanization accelerator in the rubber composition, and the improvement in the adhesion and the prevention of aging can be achieved simultaneously.

BRIEF DESCRIPTION OF THE DRAWINGS

FIG. 2 shows a schematic sectional view exhibiting an example of the pneumatic tire of the present invention.

DETAILED DESCRIPTION OF THE PREFERRED EMBODIMENT

Figure 1:
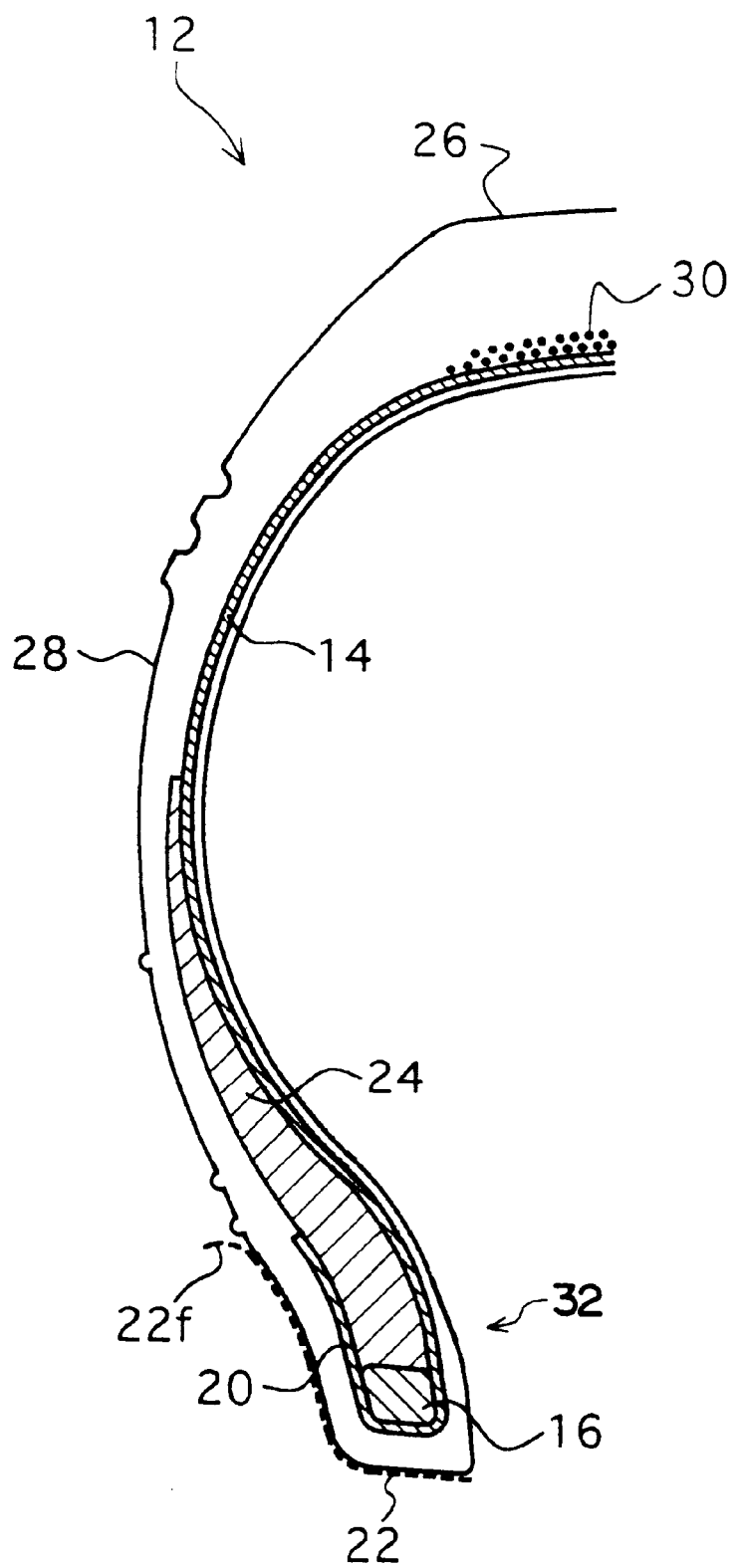
FIG. 1 shows a sectional view exhibiting an embodiment of the structure of the bead part of the pneumatic tire of the present invention.

In the above general formula of the vulcanization accelerator used in the present invention, $R^1$ represents a hydrogen atom, an alkyl groups, or an aryl group, and $R^2$ represents an alkyl group or an aryl group when $R^1$ represents a hydrogen atom, and represents a hydrogen atom, an alkyl group, or an aryl group when $R^1$ represents an alkyl group or an aryl group.

When $R^1$ and/or $R^2$ is an alkyl group, the alkyl group is preferably an alkyl group having 1 to 6 carbon atoms, more preferably methyl group or ethyl group. When $R^1$ and/or $R^2$ is an aryl group, the aryl group is preferably an aryl group having 6 to 10 carbon atoms, more preferably phenyl group.

Specific examples of the vulcanization accelerator include 2-mercapto-monoalkylbenzothiazoles, such as 2-mercapto-4-methylbenzothiazole, 2-mercapto-4-ethylbenzothiazole, 2-mercapto-5-methylbenzothiazole, 2-mercapto-5-ethylbenzothiazole, 2-mercapto-6-methylbenzothiazole, and 2-mercapto-6-ethylbenzothiazole; 2-mercapto-dialkylbenzothiazoles, such as 2-mercapto-4,5-dimethylbenzothiazole and 2-mercapto-4,5-diethylbenzothiazole; 2-mercapto-monoarylbenzothiazoles, such as 2-mercapto-4-phenylbenzothiazole, 2-mercapto-5-phenylbenzothiazole, and 2-mercapto-6-phenylbenzothiazole; bis(monoalkylbenzothiazolyl-2)-disulfides, such as bis(4-methylbenzothiazolyl-2)-disulfide, bis(4-ethylbenzothiazolyl-2)-disulfide, bis(5-methylbenzothiazolyl-2)-disulfide, bis(5-ethylbenzothiazolyl-2)-disulfide, bis(6-methylbenzothiazolyl-2)-disulfide, and bis(6-ethylbenzothiazolyl-2)-disulfide; bis(dialkylbenzothiazolyl-2)-disulfides, such as bis(4,5-dimethylbenzothiazolyl-2)-disulfide and bis(4,5-diethylbenzothiazolyl-2)-disulfide; and bis(monoarylbenzothiazolyl-2)-disulfides, such as bis(4-phenylbenzothiazolyl-2)-disulfide, bis(5-phenylbenzothiazolyl-2)-disulfide, and bis(6-phenylbenzothiazolyl-2)-disulfide.

Among these compounds, bis(4-methylbenzothiazolyl-2)-disulfide, bis(5-methylbenzothiazolyl-2)-disulfide, 2-mercapto-4-methylbenzothiazole, and 2-mercapto-5-methylbenzothiazole are preferable. These can be used solely or in combination of two or more.

The process for producing the vulcanization accelerator is not particularly limited. For example, the vulcanization accelerator can be produced in accordance with the process described in Japanese Patent Application Laid-Open (JP-A) No. 49-93361.

The vulcanization accelerator is used in an amount of 0.2 to 5.0 parts by weight per 100 parts by weight of the rubber component.

In the present invention, when the above vulcanization accelerator is used in a ply coating rubber, the vulcanization accelerator is preferably used in an amount of 0.2 to 5.0 parts by weight and more preferably 0.2 to 2.0 parts by weight per 100 parts by weight of the rubber component. When the amount of the vulcanization accelerator is less than 0.5 parts by weight, the effect of improving the resistance to deterioration is not exhibited. When the amount is more than 5.0 parts by weight, the modulus of the elasticity of the rubber composition is excessively high to cause decrease in the resistance to crack growth.

In the present invention, when the above vulcanization accelerator is used in a rubber for a bead filler, the vulcanization accelerator is used preferably in an amount of 0.3 to 8.0 parts by weight and more preferably 0.3 to 5.0 parts by weight per 100 parts by weight of the rubber component. When the amount of the vulcanization accelerator is less than 0.3 parts by weight, the additional cross-linking during the tire use cannot sufficiently be suppressed. When the amount is more than 8.0 parts by weight, the resistance to scorch is inferior to cause inferior workability.

In the present invention, when the above vulcanization accelerator is used in a belt coating rubber, which comprises a steel cord and a belt coating rubber, of a pneumatic tire, the vulcanization accelerator is used in an amount of 0.2 to 2.0 parts by weight per 100 parts by weight of the rubber component. When the amount of the vulcanization accelerator is less than 0.2 parts by weight, the effect of preventing the decrease in adhesion, and heat aging in the last stage of tire use is insufficient. When the amount is more than 2.0 parts by weight, the adhesion in the last stage of tire use is decreased.

In the present invention, when the above vulcanization accelerator is used in a ply coating rubber, natural rubber and synthetic rubbers, such as isoprene rubber, butadiene rubber, and butadiene-styrene rubber can be used alone or in combination as the rubber component.

In the present invention, when the above vulcanization accelerator is used in a rubber composition for a bead filler, the rubber component is not particularly limited, and butadiene rubber (BR), styrene-butadiene rubber (SBR), isoprene rubber (IR), natural rubber (NR), and mixtures of these rubbers can be used. A rubber component comprising 100 to 50 parts by weight of NR and 0 to 50 parts by weight of SBR is preferably used, and a rubber component comprising 100 to 80 parts by weight of NR and 0 to 20 parts by weight of SBR is more preferably.

In the present invention, when the above vulcanization accelerator is used in a belt coating rubber of a pneumatic tire, natural rubber and synthetic rubbers, such as copolymers of a vinylaromatic hydrocarbon and a conjugated diene, isoprene rubber, butadiene rubber, butyl rubber (including halogenated butyl rubber), and ethylene-propylene rubber can be used as the rubber component. These rubber materials can be used in any desired amount as long as the effects of the present invention are not adversely affected. Moreover, any of the rubber material can be used alone or in combination. It is preferred, however, that a rubber component comprising 75 to 100 parts by weight of natural rubber is used because the belt coating rubber is required to exhibit excellent breaking properties.

The conjugated diene monomer used for preparing the copolymer of a vinyl aromatic hydrocarbon and a conjugated diene is a conjugated diene hydrocarbon having 4 to 12 carbon atoms, preferably 4 to 8 carbon atoms, in a molecule. Specific examples of the conjugated diene hydrocarbon include 1,3-butadiene, isoprene, 2,3-dimethyl-1,3-butadiene, 1,3-pentadiene, and octadiene. A single type or a mixture of two or more types of these compounds can be used. It is particularly preferred that 1,3-butadiene is used.

Examples of the vinylaromatic hydrocarbon which is copolymerized with the conjugated diene include styrene, α-methylstyrene, p-methylstyrene, o-methylstyrene, p-butylstyrene, vinylnaphthalene, and the like. Among these compounds, styrene is preferable.

The process for preparing the rubber material used in the present invention is not particularly limited. For example, for producing a general use copolymer of a vinylaromatic hydrocarbon and a conjugated diene, the conjugated diene monomer and the vinylaromatic hydrocarbon can be copolymerized by, for example, solution polymerization using an organolithium initiator, the emulsion polymerization, or the suspension polymerization. As the copolymer, butadiene-styrene copolymers (hereinafter, suitably referred to as SBR) having excellent abrasion resistance and resistance to aging are preferable.

In the rubber composition of the present invention, additives, such as, coupling agents for silica, vulcanizing agents, softeners, zinc oxide, stearic acid, antioxidants, antiozonants, fillers such as carbon black and silica, and wax, can suitably be used in combination with the rubber component and the vulcanization accelerator within the range that the effect of the present invention is not adversely affected.

Sulfur can be used as a vulcanizing agent. The preferable amount of the vulcanizing agent is, as sulfur, 2 to 10 parts by weight, and more preferably, 3 to 8 parts by weight, per 100 parts by weight of the rubber component. When the amount is less than 2 parts by weight, sufficient adhesion between the rubber composition and the steel cord may not be able to be obtained, and when the amount is more than 10 parts by weight, the resistance to the heat aging tends to be deteriorated.

The rubber composition in the present invention can be obtained by mixing the components using a mixing machine, such as rolls, an internal mixer, and a Bambury mixer.

In the present invention, when the above rubber composition is used in a bead filler, it is necessary that the tensile stress at elongation of 50% (M50) of the rubber composition be 2.9 MPa or more. When the M50 is less than 2.9 MPa, a sufficient controllability cannot be obtained. The M50 is preferably about 3.9 to 11.0 MPa. When the rubber composition has a M50 smaller than 2.9 MPa, the effect of increasing the durability in the last stage of tire use by increasing the resistance to fracture of the bead filler is small even when 0.3 to 8.0 parts by weight of the vulcanization accelerator represented by the above general formula is comprised. This is because a bead filler which comprises as a relatively soft rubber composition having an M50 of less than 2.9 MPa exhibits sufficient resistance to fracture without any vulcanization accelerator of the present invention. When the present invention is applied to a hard rubber having a M50 of 2.9 MPa or more which shows inferior resistance to fracture of the bead filler in the last stage of tire use but exhibits excellent controllability of the tire, a remarkable improvement is obtained.

In the present invention, when the above rubber composition is used for a belt layer, the rubber composition is shaped into a sheet, a steel cord is disposed between two sheets of the rubber composition, to obtain a belt layer. The belt layer is layered with carcass plies in accordance with a conventional method, and the obtained products constitute the pneumatic radial tire of the present invention in combination with other components and vulcanized.

The tire of the present invention can be obtained by vulcanizing the rubber composition after forming.

As the steel cord used in the belt layer, a conventional steel cord can be used. The size, the number of twists, and the twisting condition can be suitably selected depending upon the required properties of the tire. The steel cord may be surface-treated (for example, plating) in accordance with a conventional method for increasing adhesion with the rubber composition.

The construction of a tire using a rubber bead filler which comprises the above rubber composition is described below.

FIG. 1 shows a sectional view of the pneumatic tire 12 of the present invention, exhibiting the basic structure of the tire.

Although FIG. 1 shows only the left side of the pneumatic tire for convenience, the pneumatic tire 12 of the present invention generally has a structure symmetrical on both sides. The pneumatic tire 12 comprises a pair of bead parts 32 each having a bead core 16 and a bead filler 24 which is disposed on the bead core 16, and carcass plies 14 which have a toroidal shape and whose end portions are turned up at the respective bead cores 16 from the inside to the outside to form respective turnup parts 20. The pair of bead parts 32 is disposed at the inside of a flange 22f of a rim 22 which is a part of a wheel and, when the tire 12 is filled with air, the bead parts 32 are pushed outward by the inner pressure of the tire 12 and fit in an inside wall of the rim flange 22f.

In the pneumatic tire 12 of this embodiment, other parts, such as the tread part 26, the sidewall part 28, and the belt part 30, have the same shapes as those in conventional radial tires, as shown in FIG. 1.

In this embodiment, the above rubber composition is used for the bead filler 24.

A bead filler to be used in the present invention may be shaped differently from that of the bead filler 24 in FIG. 1. Moreover, a combination of a bead filler made of the above rubber composition and a bead filler made of the other rubber composition can be used in the present invention.

In the pneumatic tire of the present invention, materials, shapes, and constructions which are generally used for tires can be used for other parts, such as the tread part, the sidewall part, and the belt part.

EXAMPLES

The invention will be described in more detail with reference to examples in the sections that follow. The present invention is not to be construed as being limited by the examples, however.

In the examples, part and % means parts by weight and % by weight, respectively, unless otherwise stated.

Examples 1 and 2 and Comparative Examples 1 to 5

Figure 3:
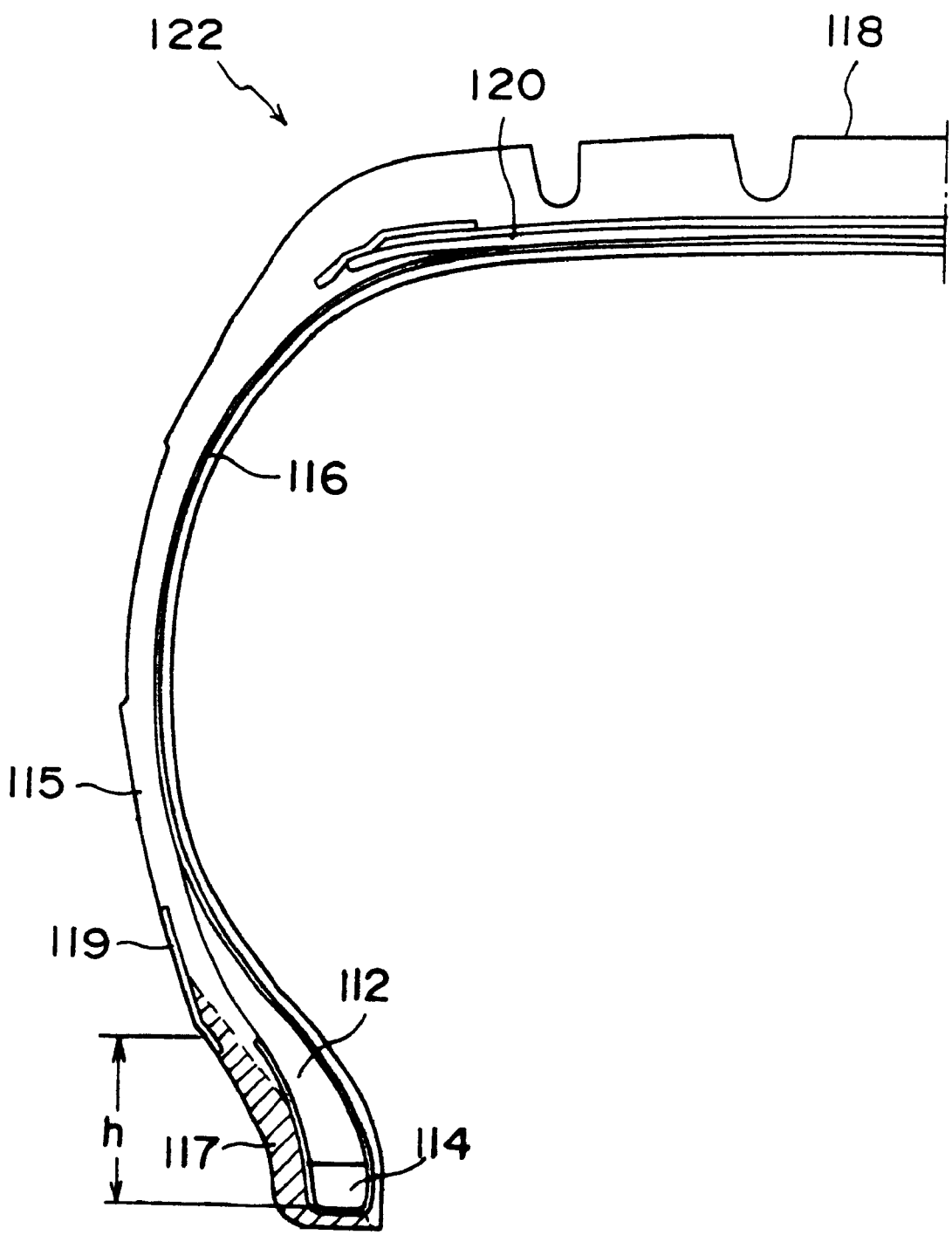
FIG. 3 shows a schematic sectional view exhibiting another example of the pneumatic tire of the present invention.

FIGS. 2 and 3 show schematic sectional views of pneumatic tires having different side structures. The pneumatic tire 110 or 122 comprises a pair of bead parts each having a bead filler 112 and a bead core 114, a carcass layer 116 which is turned up at the bead part from the inside to the outside and fixed to the bead part, a tread part 118 disposed at the crown part of the carcass layer 116, and at least two belt layers 120 disposed at the inside of the tread part 118. The carcass layer 116 comprises one or a plurality of carcass plies, and a turnup end of at least one of the carcass plies is disposed at a height h of 10 to 40 mm from the bottom of the bead core 114. In the carcass layer 116, a fiber cord is arranged in a direction substantially perpendicular to the circumferential direction of the tire 110 or 122. In the belt layer 120, layers of unextendable cords, such as a cord of aramide fiber and a steel cord as typical examples, are arranged in a direction at an angle of 10 to 30° to the circumferential direction of the tire 110 or 122 (or to the equator plane of the tire 110 or 112). Moreover, the belt layers are laid in such a manner that cords in the layers cross each other.

In the side structure shown in FIG. 2, the embodiment of the normal-side structure is adopted, wherein the lower end portion of the side rubber 115 is disposed in such a manner that the side rubber 115 covers the upper end portion of a gum chafer 117 at the outside. In contrast, in the side structure shown in FIG. 3, the embodiment of the reverse side structure is adopted, wherein the upper end of a gum chafer 117 is disposed in such a manner that the upper end portion of the gum chafer 117 covers the lower end portion of side rubber 115 at the outside. In FIG. 3, the component shown by 119 is a cover strip disposed at the boundary area between the side rubber 115 and the gum chafer 117.

The tires used in the examples and the comparative examples had a size of 185/70R14. A single sheet of polyester cord having a thread count of 50/5 cm was used for the carcass in tires of both structures shown in FIGS. 2 and 3.

Various measurements were conducted in accordance with the following methods:

(1) Evaluation of the Resistance to Ply-End Separation of a Tire

A pneumatic radial tire of size 185/70R14 was rotated on a rotating drum under the conditions of an inner pressure of the tire of 0.2 MPa, an applied load of 600 kg, and the length of a crack at the end portion of the ply after driven for 10,000 km at a speed of 50 km/hour was measured. When the length of the crack at the end portion of the ply was 5 mm or less, the resistance to ply-end separation is considered to be good.

(2) Evaluation of Rolling Resistance

A new tire of size 185/70R14 was prepared and mounted on a drum fog rolling resistance measurement. After the tire speed reached 200 Km/h, motor was disconnected and tire and drum were allowed to rotate by inertia. The speed decrease of the tire at the specific speeds were measured at 180 Km/h, 140 Km/h, 120 Km/h, 100 Km/h, 80 Km/h, 60 Km/h, 40 Km/h, and 20 Km/h, and the rolling resistance at specific speeds were obtained. The rolling resistance at each speed was taken as an index to the control, which was calculated by the following as an index to the control, which was calculated by the following equation, and the average of the data at every speed measured was taken as the rolling resistance of each tire. The results were shown in Table 2. The larger the value, the better (smaller) the rolling resistance.

$$\text{Rolling Resistance} = \frac{\text{rolling resistance of the control tire}}{\text{rolling resistance of the test tire}} \times 100$$

In the equation, the value obtained in Comparative Example 1 was used as the moment of inertia of a control tire. The speed in the measurement was varied at 20, 40, 60, 80, 100, 120, 140, 160, and 180 km/hour, and an average value was calculated from the obtained values at every test speed. Results are shown in Table 2. The larger the value, the better (smaller) the rolling resistance.

Ply-coating rubber compositions A, B, C, D, E, and F were prepared in accordance with the formulations shown in Table 1. Pneumatic tires of size 185/70R14 were prepared by using combinations of these rubber compositions, various side structures of a tire, and various length of the turn up end of ply, and the length of a crack at the end portion of the ply and the rolling resistance were measured with the prepared tires. Results are shown in Table 2.

TABLE 1

| rubber composition | A | B | C | D | E | F |
|---|---|---|---|---|---|---|
| formulation (part by weight) | | | | | | |
| natural rubber | 60 | 60 | 60 | 60 | 60 | 60 |
| SBR 1) | 40 | 40 | 40 | 40 | 40 | 40 |
| carbon black 2) | 50 | — | — | 50 | 50 | 50 |
| carbon black 3) | — | 50 | — | — | — | — |
| carbon black 4) | — | — | 50 | — | — | — |
| process oil | 15 | 15 | 15 | 15 | 15 | 15 |
| antioxidant 5) | 1.0 | 1.0 | 1.0 | 1.0 | 1.0 | 1.0 |
| ZnO | 4.0 | 4.0 | 4.0 | 4.0 | 4.0 | 4.0 |
| accelerator NS 6) | 1.0 | 1.0 | 1.0 | 2.0 | — | — |

TABLE 1-continued

| rubber composition | A | B | C | D | E | F |
|---|---|---|---|---|---|---|
| accelerator 4MDM 7) | — | — | — | — | 2.5 | — |
| accelerator 5MDM 8) | — | — | — | — | — | 2.5 |
| sulfur | 3.0 | 3.0 | 3.0 | 2.0 | 3.0 | 3.0 |

1) JSR 1502 product of Japan Synthetic Rubber Co., Ltd.
2) N330
3) N220
4) N110
5) A polymer of 2,2,4-trimethyl-1,2-dihydroquinoline
6) N-t-Butyl-2-benzothiazolylsulfenamide
7) bis(4-Methylbenzothiazolyl-2)-disulfide
8) bis(5-Methylbenzothiazolyl-2)-disulfide

TABLE 2

| | Comparative Example | | | | Example | |
|---|---|---|---|---|---|---|
| | 1 | 2 | 3 | 4 | 1 | 2 |
| rubber of ply | A | A | B | C | D | E | F |
| side structure (No. of figure) | 2 | 3 | 2 | 2 | 2 | 2 | 2 |
| height of ply-end (mm) | 20 | 20 | 20 | 20 | 20 | 20 | 20 |
| length of crack at ply-end portion (mm) | 10 | 3 | 4 | 3 | 9 | 3 | 4 |
| rolling resistance (index) | 100 | 100 | 95 | 93 | 100 | 100 | 100 |
| workability | 0 | $\Delta^x$ | 0 | 0 | 0 | 0 | 0 |

As shown in Table 2, the pneumatic tires of the present invention maintained low rolling resistance, showed improved resistance to ply-end separation throughout the entire term of tire use, and therefore, increased tire life.

In Comparative Examples in which the vulcanization accelerator specified in the present invention was not used, simultaneous improvement in low rolling resistance and resistance to crack growth at the end portion of a ply could not be achieved. The tire prepared in Comparative Example 2 required an increase in working for production and is not preferable.

Examples 3 to 6 and Comparative Examples 6 to 10

In accordance with the formulations shown in Tables 3 and 4, components were mixed together in a Bambury mixer to prepare rubber compositions, and tires of size 205/65R15 were prepared by using the prepared rubber compositions for the bead filler. The tensile stress at 50% elongation of the obtained rubber compositions was measured. Controllability and resistance to fracture of the bead filler (durability) in the last stage of tire use were evaluated by using the obtained tires. The methods of evaluation are shown below.

(1) Mooney Viscosity Measurement

Mooney viscosity was measured at 130° C. in accordance with Japanese Industrial Standard (JIS) K 6300-1994.

(2) Tensile Stress at 50% Elongation (M50)

The tensile stress at 50% elongation of a rubber composition after vulcanization was measured in accordance with the method of Japanese Industrial Standard (JIS) K 6301-1995.

(3) Controllability

A road test of a new tire was conducted at a proving ground at an applied inner pressure of 0.2 MPa, and controllability was evaluated from the overall evaluation of the driving property, braking property, response to steering, and controllability under steering. Results are shown as an index with reference to the value obtained in Comparative Example 10 which is set to 100. The larger the value, the better the controllability.

(4) Resistance to Fracture of a Bead Filler

A tire which was equipped at the rear shaft of a car and had been used on 50,000 km of good public roads was pressed to a metal drum and rotated under a condition such that the strain energy concentrated to the turnup end portion of the carcass ply of the tire was about 4 times that of strain energy in normal driving. The test was continued until the bead filler fractured in the vicinity of the end portion of the ply, and the driving distance at the time that the fracture occurred was measured. When the distance exceeded 20,000 km, the tire was regarded to have passed the test. Results are shown in Tables 3 and 4.

TABLE 3

| Comparative Example | 6 | 7 | 8 | 9 | 10 |
|---|---|---|---|---|---|
| formulation (part by weight) | | | | | |
| NR | 100 | 100 | 100 | 100 | 100 |
| SBR[1] | — | — | — | — | — |
| Carbon black N330 | 70 | 70 | 70 | 70 | 50 |
| process oil | 5 | 5 | 5 | 5 | 5 |
| stearic acid | 2 | 2 | 2 | 2 | 2 |
| zinc oxide | 5 | 5 | 5 | 5 | 5 |
| phenolic resin | 4 | 4 | 16 | 16 | 16 |
| antioxidant | 1 | 1 | 1 | 1 | 1 |
| DZ[2] | 1 | — | 1 | 1 | 1 |
| DM[3] | 1 | — | 1 | 2.5 | 1 |
| 4M-DM[4] | — | 3.5 | — | — | — |
| sulfur | 4 | 4 | 4 | 2.5 | 4 |
| results of tests | | | | | |
| Mooney viscosity 1 + 4 (130° C.) | 65 | 63 | 73 | 75 | 64 |
| M50 | 2.4 | 2.5 | 5.9 | 6.3 | 4.1 |
| controllability of tire | 86 | 88 | 115 | 118 | 100 |
| durability by drum test | 20,000 passed | 20,000 passed | 14,000 | 16,500 | 17,500 |

[1] A product of Japan Synthetic Rubber Co., Ltd.; SBR 1500
[2] N,N'-Dicyclohexyl-2-benzothiazolylsulfenamide
[3] Dibenzothiazyl disulfide
[4] bis(4-Methylbenzothiazolyl-2)-disulfide

TABLE 4

| Example | 3 | 4 | 5 | 6 |
|---|---|---|---|---|
| Formulation (part by weight) | | | | |
| NR | 100 | 80 | 100 | 100 |
| SBR[1] | — | 20 | — | — |
| Carbon black N330 | 70 | 70 | 70 | 50 |
| process oil | 5 | 5 | 5 | 5 |
| stearic acid | 2 | 2 | 2 | 2 |
| zinc oxide | 5 | 5 | 5 | 5 |
| phenolic resin | 16 | 16 | 16 | 16 |
| antioxidant | 1 | 1 | 1 | 1 |
| 4M-DM[2] | 3.5 | 3.5 | — | 3.5 |
| 5M-DM[3] | — | — | 3.5 | — |
| sulfur | 4 | 4 | 4 | 4 |

TABLE 4-continued

| Example | 3 | 4 | 5 | 6 |
|---|---|---|---|---|
| Results of tests | | | | |
| Mooney viscosity ML + 4 (130° C.) | 72 | 67 | 70 | 63 |
| M50 | 6.2 | 6.0 | 5.9 | 4.4 |
| controllability of tire | 118 | 115 | 115 | 102 |
| durability by drum test | 20,000 passed | 20,000 passed | 20,000 passed | 20,000 passed |

[1] A product of Japan synthetic Rubber Co., Ltd.; SBR 1500
[2] bis(4-Methylbenzothiazolyl-2)-disulfide
[3] bis(5-Methylbenzothiazolyl-2)-disulfide As shown by the results in Examples 3 to 6, controllability and durability in the last stage of tire use were both excellent when the vulcanization accelerator used in the present invention was comprised in the hard bead filler having a M50 of 2.9 MPa or more.

It is also found that the tires in Examples 3 to 6 showed the same controllability as that of tires in Comparative Examples 7 to 10 in which conventional vulcanization accelerators were used and better durability in the last stage of tire use than that of the tires in Comparative Examples.

Examples 7 and 8 and Comparative Examples 11 to 15

Rubber compositions [1] to [7] for belt layers of pneumatic tires were prepared by a conventional method in accordance with the formulations shown in Table 5.

The materials used for the preparation were as follows:
NR (natural rubber): RSS
Carbon black: Seast 3 (a trade name) available from TOKAI CARBON Co., Ltd.
adhesive for steel and rubber: MANOBOND C22.5 (a trade name) available from SHEPHERD CHEMICAL Company

TABLE 5

| rubber composition | [1] | [2] | [3] | [4] | [5] | [6] | [7] |
|---|---|---|---|---|---|---|---|
| NR | 100 | 100 | 100 | 100 | 100 | 100 | 100 |
| carbon black | 60 | 60 | 60 | 60 | 60 | 60 | 60 |
| zinc oxide | 5.0 | 5.0 | 5.0 | 5.0 | 5.0 | 5.0 | 5.0 |
| adhesive for steel and rubber MANOBOND | 2.0 | 1.0 | 1.0 | 1.0 | 1.0 | 1.0 | 1.0 |
| antioxidant 6C[1] | 1.0 | 1.0 | 1.0 | 1.0 | 1.0 | 1.0 | 1.0 |
| vulcanization accelerator | | | | | | | |
| DZ[2] | — | 0.5 | 1.0 | 1.0 | 1.0 | 1.0 | 0.5 |
| 4M-DM[3] | 1.5 | 1.0 | — | 3.0 | 0.1 | — | — |
| vulcanizing agent | | | | | | | |
| sulfur | 6.0 | 6.0 | 6.0 | 6.0 | 6.0 | 7.0 | 6.0 |

[1] N-(1,3-Dimethyl-butyl)-N'-phenyl-p-phenylenediamine
[2] N,N'-Dicyclohexyl-2-benzothiazolylsulfenamide
[3] bis(4-Methylbenzothiazolyl-2)-disulfide Then, belt layers are prepared with steel cords and rubber compositions [1] to [7] shown in Table 5. Radial tires of size 185/70R14 having the prepared belt layers were prepared in accordance with a conventional method and used for the tests in Examples 7 and 8 and Comparative Example 11 to 15.

Various tests were conducted in accordance with the methods below. For evaluation after tire use, 50 tires were prepared for each example or comparative example, used on 80,000 km of roads in Japan, then recovered, and evaluated. The results were shown as an average of 50 tires prepared for each sample.

(1) Evaluation of Resistance to Belt-End Separation After Use

A belt layer was removed from the recovered tire. The belt layer of half of the circumference of a tire was cut at random locations. The section was visually observed, and the depth of a tip of a steel cord buried in the belt layer was measured. Results of the evaluation are shown as an index with reference to the value obtained in Comparative Example 11 which is set to 100. The larger the value, the better the resistance to belt-end separation.

(2) Evaluation of Adhesion After Use

Samples were prepared from the other half of the belt layer stated above to evaluate adhesion use. A steel cord in the belt layer was pulled by a tensile tester at a speed of 50 mm/min, and the condition of adhesion of rubber composition on the surface of the exposed steel cord was visually observed and evaluated in accordance with the following criterion. Three cords were tested per each sample.

Rank A: 80 to 100% of the surface of a steel cord covered with a rubber composition
Rank B: 60% or more and less than 80%
Rank C: 40% or more and less than 60%
Rank D: 20% or more and less than 40%
Rank E: 0% or more and less than 20% of the surface of a steel cord, i.e., the surface of a steel cord exposed to visual observation (3) Retention of Elongation at the Time of Cutting (Retention of Eb)

From each tire before use and tire recovered above, a sample having a thickness of 0.2 mm was cut out of the belt layer, and test pieces of a dumbbell shape were prepared. The tensile test in accordance with the method of Japanese Industrial Standard (JIS) K 6301-1995 was conducted with the obtained samples, and the retention of Eb was calculated in accordance with the following equation:

$$\text{retention of } Eb = \frac{Eb \text{ of belt coating rubber after use}}{Eb \text{ of belt coating rubber before use}} \times 100$$

The larger the value, the better the durability in heat aging. Results are shown in Table 6.

TABLE 6

| | Example | | Comparative Example | | | | |
|---|---|---|---|---|---|---|---|
| | 7 | 8 | 11 | 12 | 13 | 14 | 15 |
| rubber composition | [1] | [2] | [3] | [4] | [5] | [6] | [7] |
| belt-end separation (index) | 103 | 119 | 100 | 115 | 103 | 89 | 91 |
| adhesion of rubber and steel cord after use | A | A | B | D | B | A | A |
| retention of Eb(%) | 76 | 73 | 57 | 85 | 58 | 49 | 53 |

As clearly shown in Table 6, the pneumatic radial tires in examples all showed excellent resistance to belt-end separation after being used on 80,000 km of road in Japan. No decrease in adhesion between the steel cord and the rubber composition was observed, and the adhesion of rubber to the surface of the steel cord was found to be excellent. The retention of elongation at breakage was also excellent, and the deterioration by heat aging was found to be suppressed.

In contrast, the pneumatic radial tires obtained in Comparative Examples 11 to 15 in which the vulcanization accelerator of the present invention was not used or used in an amount outside the range specified in the present invention showed either inferior adhesion between the steel cord and the rubber composition or inferior retention of Eb. None of these tires showed excellent adhesion or resistance to aging simultaneously, and it was shown that these tires had a problem with durability in the last stage of tire use.

What is claimed is:

1. A pneumatic tire comprising a pair of bead portions each having a bead filler and a bead core, a carcass layer toroidally extended between the bead portions, a tread disposed at a crown portion of the carcass layer, and at least two belt layers arranged at the inside of the tread, the carcass layer having one or plural carcass plies, end portions of the carcass plies being turned up at the respective bead portions, and ends of the turned-up portions of the carcass plies being disposed at a height of 10 to 40 mm from the bottom of the respective bead portions, wherein at least one of the bead fillers, the carcass plies and the belt layers comprise a diene-based rubber composition, and the diene-based rubber composition comprises:

a rubber component selected from the group consisting of butadiene rubber, styrene-butadiene rubber, isoprene rubber, natural rubber and ethylene-propylene-diene rubber;

a sulfur vulcanizing agent in an amount of 2 to 10 parts by weight per 100 parts by weight of the rubber component; and a vulcanization accelerator represented by the following general formula:

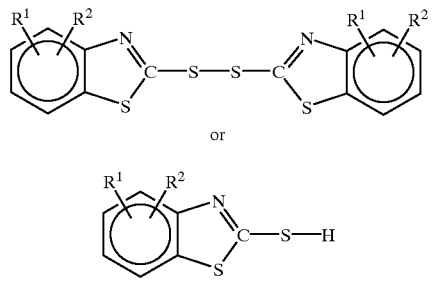

or wherein $R^1$ represents a hydrogen atom, an alkyl group, or an aryl group, and $R^2$ represents an alkyl group or an aryl group when $R^1$ represents a hydrogen atom, and represents a hydrogen atom, an alkyl group, or an aryl group when $R^1$ represents an alkyl group or an aryl group, in an amount of 0.2 to 8.0 parts by weight per 100 parts by weight of the rubber component.

2. A pneumatic tire according to claim 1, wherein the diene-based rubber composition in said carcass ply comprises 0.2 to 5.0 parts by weight of said vulcanization accelerator per 100 parts by weight of said rubber composition.

3. A pneumatic tire according to claim 1, wherein the diene-based rubber composition in said bead filler comprises 0.3 to 8.0 parts by weight of said vulcanization accelerator per 100 parts by weight of said rubber composition and has a tensile stress of 2.9 MPa or more at 50% elongation.

4. A pneumatic tire according to claim 1, wherein the diene-based rubber composition in said bead layer comprises 0.2 to 2.0 parts by weight of said vulcanization accelerator per 100 parts by weight of said rubber composition.

5. A pneumatic tire according to claim 1, wherein $R^1$ and/or $R^2$ in the general formula representing said vulcanization accelerator represents an alkyl group having 1 to 6 carbon atoms.

6. A pneumatic tire according to claim 1, wherein $R^1$ and/or $R^2$ in the general formula representing said vulcanization accelerator represents a methyl group or an ethyl group.

7. A pneumatic tire according to claim 1, wherein $R^1$ and/or $R^2$ in the general formula representing said vulcanization accelerator represents an aryl group having 6 to 10 carbon atoms.

8. A pneumatic tire according to claim 1, wherein $R^1$ and/or $R^2$ in the general formula representing said vulcanization accelerator represents a phenyl group.

9. A pneumatic tire according to claim 1, wherein the vulcanization accelerator is at least one selected from the group consisting of bis(monoalkylbenzothiazolyl-2)-disulfides and 2-mercapto-monoalkylbenzothiazoles.

10. A pneumatic tire according to claim 9, wherein said vulcanization accelerator is at least one selected from the group consisting of bis(4-methylbenzothiazolyl-2)-disulfide, bis(5-methylbenzothiazolyl-2)-disulfide, 2-mercapto-4-methyl-benzothiazole, and 2-mercapto-5-methylbenzothiazole.

* * * * *